US008779060B2

(12) United States Patent
Hert et al.

(10) Patent No.: US 8,779,060 B2
(45) Date of Patent: Jul. 15, 2014

(54) ELASTOMER THERMOPLASTIC MIXTURES AND COMPOSITIONS HAVING IMPROVED PROPERTIES, METHOD OF MAKING SAID COMPOSITIONS AND APPLICATIONS THEREOF

(75) Inventors: Marius Hert, Epfig (FR); Dominique Jousset, Serquigny (FR)

(73) Assignee: Arkema France, Colombes (FR)

( * ) Notice: Subject to any disclaimer, the term of this patent is extended or adjusted under 35 U.S.C. 154(b) by 527 days.

(21) Appl. No.: 12/667,265

(22) PCT Filed: Jul. 1, 2008

(86) PCT No.: PCT/FR2008/051213
§ 371 (c)(1),
(2), (4) Date: Jun. 17, 2010

(87) PCT Pub. No.: WO2009/007634
PCT Pub. Date: Jan. 15, 2009

(65) Prior Publication Data
US 2010/0270820 A1    Oct. 28, 2010

(30) Foreign Application Priority Data
Jul. 2, 2007 (FR) ..................................... 07 56231

(51) Int. Cl.
| *C08L 23/08* | (2006.01) |
| *C08L 23/10* | (2006.01) |
| *C08L 77/00* | (2006.01) |
| *C08F 255/00* | (2006.01) |
| *C08L 51/06* | (2006.01) |
| *C08F 255/02* | (2006.01) |
| *C09D 151/06* | (2006.01) |
| *C08L 23/06* | (2006.01) |
| *C08L 53/00* | (2006.01) |
| *C08L 23/16* | (2006.01) |
| *C08L 23/12* | (2006.01) |
| *C09J 151/06* | (2006.01) |
| *C08L 23/22* | (2006.01) |
| *C08L 23/36* | (2006.01) |

(52) U.S. Cl.
CPC ............ *C08L 51/06* (2013.01); *C08L 23/0869* (2013.01); *C08L 2205/03* (2013.01); *C08L 23/36* (2013.01); *C08F 255/00* (2013.01); *C08F 255/026* (2013.01); *C08L 23/0853* (2013.01); *C09D 151/06* (2013.01); *C08L 23/06* (2013.01); *C08L 53/00* (2013.01); *C08L 23/16* (2013.01); *C08F 255/02* (2013.01); *C08L 23/12* (2013.01); *C08L 23/10* (2013.01); *C09J 151/06* (2013.01); *C08L 23/22* (2013.01)
USPC ............................................ 525/69; 525/179

(58) Field of Classification Search
USPC .................................................... 525/69, 179
See application file for complete search history.

(56) References Cited

U.S. PATENT DOCUMENTS

| 4,130,535 | A | 12/1978 | Coran et al. | |
| 5,160,475 | A | 11/1992 | Asano et al. | |
| 5,266,626 | A | 11/1993 | Hert et al. | |
| 5,843,577 | A | 12/1998 | Ouhadi et al. | |
| 6,300,418 | B1 * | 10/2001 | Brzoskowski et al. | 525/191 |
| 6,414,081 | B1 | 7/2002 | Ouhadi | |
| 6,875,520 | B2 | 4/2005 | Court et al. | |
| 2010/0021687 | A1 * | 1/2010 | Su | 428/141 |
| 2010/0222479 | A1 * | 9/2010 | Honda et al. | 524/261 |
| 2012/0020637 | A1 * | 1/2012 | Maeda et al. | 385/145 |

* cited by examiner

*Primary Examiner* — Jeffrey Mullis
(74) *Attorney, Agent, or Firm* — Buchanan Ingersoll & Rooney P.C.

(57) ABSTRACT

The mixture of the invention contains, for 100 parts in weight of (A)+(B): (A) 10 to 90 parts in weight of at least one non-nanostructured olefinic thermoplastic polymer; (B) 90 to 10 parts in weight of a formulation of at least one elastomer having unsaturated double bonds and capable of reacting with a cross-linking or vulcanization agent, said formulation containing a crosslinking or vulcanization system of said elastomer(s), at least one plasticizer, and the standard additives present in elastomer formulations; (C) up to 100 parts in weight, relative to (A)+(B), of at least one copolymer grafted with polyamide blocks, said copolymer comprising a polyolefin trunk and at least 1.3 polyamide grafts on said trunk in average, and having a nanostructured organization, wherein said grafts are attached to the trunk by the rest of an unsaturated monomer (X) having a function capable of reacting with a polyamide with an amine end; and rest of said unsaturated monomer (X) being attached on the trunk by grafting or copolymerization from its double bond thereof, and wherein (A) and (B) in the mixture can already have been combined together by the crosslinking or vulcanization dynamic method in order to provide a crosslinked or vulcanized thermoplastic composition.

10 Claims, No Drawings

ELASTOMER THERMOPLASTIC MIXTURES AND COMPOSITIONS HAVING IMPROVED PROPERTIES, METHOD OF MAKING SAID COMPOSITIONS AND APPLICATIONS THEREOF

The present invention relates to mixtures of thermoplastic olefin polymers and unsaturated elastomers which have been formulated with a crosslinking or vulcanizing system and, conventionally, with plasticizers, fillers, and other customary additives.

The invention also concerns a process for preparing corresponding thermoplastic elastomer compositions by dynamic vulcanizing or crosslinking of such a formulated elastomer in such an olefinic thermoplastic polymer.

It concerns the resulting thermoplastic elastomer compositions, the uses thereof for the manufacture of finished articles, especially by technologies of extrusion, injection molding, and compression molding, and the finished products thus obtained.

The best-known thermoplastic elastomers having rubbery properties are products of a process of dynamic vulcanizing of a formulated elastomer—such as a formulated ethylene-propylene-diene (EPDM) elastomer—in a matrix which is generally of polyolefin type—polypropylene (PP) in particular or else polyethylene (PE).

In such a process, the thermoplastic, such as the PP or PE, is mixed with an elastomer, such as EPDM, which is formulated with a vulcanizing system, and this elastomer is crosslinked during the mixing phase.

The products obtained are referred to as "thermoplastic vulcanizates" (TPVs) and are composed of a thermoplastic matrix, which coats rubber particles a few microns in size, it being possible for the rubber phase to be the majority phase (up to 85% by weight). The products may be employed as thermoplastics by extrusion or injection molding, while having the properties of the rubber phase, namely a low compression or tension set.

However, these alloys possess thermodynamic limitations which are inherent in the thermoplastic polymers used in the matrix, and, for thermoplastic vulcanizates (TPVs) having a PP matrix and EPDM elastomer, the service temperature limit imposed by the PP is 130° C. Moreover, the flexural modulus and high hardness of PP lead to alloys having a fairly high hardness.

International PCT Application WO 02/28959 A1 describes graft copolymers having polyamide blocks and mixtures thereof with flexible polyolefins having a flexural elastic modulus of less than 150 MPa. These low-modulus, flexible mixtures do not possess rubber elasticity at 70° C. or more, because the polyolefin in the mixture is semicrystalline, with a melting point of between 60° C. and 100° C.

It has been found that these copolymers having polyamide blocks undergo organization into structures on the nanometric scale, giving them exceptional thermomechanical strength properties. This thermomechanical behavior is manifested in an elastic modulus which is virtually constant within a temperature range from 100° C. to 180° C.

The graft polyolefins having polyamide blocks, obtained in particular by the technology of grafting monoamine polyamides onto the maleic anhydride of an ethylene/butyl acrylate/maleic anhydride terpolymer, are flexible thermoplastics having high thermomechanical strength. They exhibit a relatively high flexural elastic modulus, in particular of less than 200 MPa and more than 50 MPa, and a dynamic elastic modulus, measured at 150° C., of between 0.5 MPa and 10 MPa. This modulus is relatively constant within a wide temperature range, from 80 to 180° C., or in other words between the melting point of the ethylene/butyl acrylate/maleic anhydride terpolymer (80-100° C.) and that of the polyamide (180-220° C.) in the example given.

These copolymers having polyamide blocks are not, however, elastomers, since they have a low remanent elasticity on compression at beyond 80° C. It may be said that they do not possess rubber elasticity expressed as a percentage of compression set (CS). A thermoplastic elastomer has a CS of typically less than 50%, or even 30%, whereas the graft polyolefins having polyamide blocks have a CS of typically between 60% and 80%.

U.S. Pat. No. 4,130,535 describes alloys based on 25% to 75% of thermoplastic elastomers and 75% to 25% of olefinic rubbers, which are formulated with plasticizers and are totally crosslinked. The thermoplastic polymer is polypropylene.

Patent EP 384 822 describes compositions based on copolymers of ethylene and alpha-olefins and on rubbers based on polynorbornene which is plasticized and crosslinked, with a Shore A hardness of not more than 65, by virtue of the plasticizing capacity of the polynorbornene and of the selection of the thermoplastic polymer from among ethylene copolymers having a melting point not exceeding 130° C. These alloys have compression sets, measured at 70° C., of less than 45%.

European patent application EP 1672027 describes a thermoplastic polymer composition obtained by mixing a rubber in which a gel fraction of 30% by weight or more is dispersed uniformly in a polymer based on polyamide and/or based on polyester, and by dynamic crosslinking of the rubber. Thermoplastic polymers of this kind based on polyamide or polyester have the drawbacks of not exhibiting effective resistance to hydrolysis and to salts, and of not exhibiting low Shore A hardnesses.

U.S. Pat. No. 5,843,577 describes thermoplastic elastomers having improved surface properties, which are obtained by incorporating a copolymer of a functionalized polyolefin and a polyamide into said thermoplastic elastomer.

The aim of the present invention is to provide a TPV alloy having enhanced properties relative to the known systems, but without sacrificing the good properties of such systems. Thus, relative to the known systems based on polypropylene, the aim in particular is for a better temperature behavior, in light of the fact that polypropylene loses its properties at around 130-140° C., the possibility of attaining lower hardnesses, and the possibility of adhesion to other materials, especially polyamide. Relative to the known systems based on polyamide, the aim particularly is for better resistance to hydrolysis and to salts, such as zinc chloride, and the possibility of attaining lower hardnesses.

These objectives are achieved in accordance with the invention by virtue of the use of a flexible thermoplastic base having a high heat resistance, which retains its properties up to around 170-180° C., and which forms a continuous phase still comprising free functional groups, such as free maleic anhydride groups, thereby promoting the adhesion of the resulting TPV to materials such as polyamide or metals. The TPVs of the present invention are useful for producing articles having good elastic properties within a wide temperature range of −40° C. to 160° C.

The present invention accordingly firstly provides a mixture comprising, per 100 parts by weight of (A)+(B):
(A) 10 to 90 parts by weight of at least one non-nanostructured olefinic thermoplastic oligomer;
(B) 90 to 10 parts by weight of a formulation of at least one elastomer which has unsaturated double bonds and is capable of reacting with a crosslinking or vulcanizing agent, said formulation including a system for crosslinking or vulcanizing said elastomer or elastomers, at least one plasticizer, and the additives customary in elastomer formulations;

(C) up to 100 parts by weight, relative to (A)+(B), of at least one graft copolymer having polyamide blocks, said copolymer being composed of a polyolefin backbone and of on average at least 1.3 polyamide grafts on said backbone, and having a nanostructured organization, in which said grafts are attached to the backbone by the residues of an unsaturated monomer (X) having a function which is capable of reacting with an amino-terminal polyamide; and the residues of said unsaturated monomer (X) being attached to the backbone by grafting or copolymerization from its double bond, it being possible for (A) and (B) in the mixture to have already being combined together by the dynamic vulcanizing or crosslinking process, to give a vulcanized or crosslinked thermoplastic composition.

The proportion of constituent (A) is especially from 15 to 75 parts by weight to, respectively, 85 to 25 parts by weight of constituent (B).

The proportion of constituent (C) is especially from 10 to 90 parts by weight relative to (A)+(B).

More particularly, constituent (C) may represent not more than 50% by weight of the mixture (A)+(C).

Constituent (A)

A polyolefin of constituent (A) is defined as being a homopolymer or copolymer of alpha-olefins or of diolefins, such as, for example, ethylene, propylene, but-1-ene, isobutylene, pent-1-ene, hex-1-ene, oct-1-ene, 3-methyl-1-pentene, 4-methyl-1-pentene, 5-methyl-1-hexene, or butadiene. Examples include:

homopolymers and copolymers of ethylene, especially low-density polyethylene (LDPE), high-density polyethylene (HDPE), linear low-density polyethylene (LLDPE), very low-density polyethylene (VLDPE), and polyethylenes obtained by metallocene catalysis, described for example in the aforementioned international PCT application; copolymers of ethylene with at least one alpha-olefin, for example a $C_3$-$C_8$ alpha-olefin, such as ethylene/propylene copolymers, ethylene-propylene elastomers (EPR), and ethylene/propylene/diene elastomers (EPDM); copolymers of ethylene with at least one product selected from the salts or esters of unsaturated carboxylic acids, such as the esters of (meth)acrylic acid with $C_1$-$C_8$ alcohols, for example methyl acrylate, or the vinyl esters of saturated carboxylic acids, such as vinyl acetate, it being possible for the proportion of comonomer to be up to 40% by weight;

homopolymers and copolymers of propylene;

block styrene/ethylene-butene/styrene (SEBS), styrene/butadiene/styrene (SBS), styrene/isoprene/styrene (SIS), and styrene/ethylene-propylene/styrene (SEPS) copolymers;

olefin polymers, such as polymers of ethylene and propylene, copolymerized or functionalized with reactive monomers, more particularly, but without limitation, with maleic anhydride.

A polyolefin of constituent (A) may thus be selected from ethylene homopolymers, propylene homopolymers, copolymers of ethylene with $C_3$-$C_8$ alpha-olefins, with esters of (meth)acrylic acid and $C_1$-$C_8$ alcohols, and with vinyl acetate.

Constituent (B)

Constituent (B) is composed of 100 parts by weight of a crosslinkable elastomer and a certain number of additives, whose amount is expressed in parts per 100 parts of elastomer (phr). These additives are incorporated into the elastomer at a sufficiently low temperature not to crosslink the elastomer, typically less than 100° C., in mixers which are well known in the rubber industry, such as Banbury mixers and roll mixers.

The unsaturated elastomer is especially selected from:

terpolymers of ethylene, propylene, and a diene (EPDM);

elastomers based on butadiene, natural (NR) or synthetic, and styrene-butadiene copolymers (SBR);

copolymers of butadiene with acrylonitrile (NBR);

partially hydrogenated copolymers of butadiene with acrylonitrile (HNBR);

elastomers based on isoprene (IR);

acrylic elastomers such as the copolymers of acrylic esters having a reactive acid or epoxy fraction, such as copolymers of methyl acrylate or butyl acrylate with acrylic acid or glycidyl methacrylate (ACR).

The crosslinking or vulcanizing system is adapted to the type of elastomer used. It is especially selected from vulcanizing agents based on sulfur, on peroxide, on phenolic resin, or on azo, maleimido, quinoid, and urethane compounds, for the diene elastomers; from agents based on polyfunctional amines, such as hexamethylenediamine carbamate, or on diisocyanates, for the acrylic elastomers having acid groups; or from agents based on ammonium salts, such as 2-methylimidazole or molecules of polyfunctional acids, for the acrylic elastomers with an epoxide group.

The proportions of the crosslinking or vulcanizing system are the customary proportions known to a person skilled in the art for obtaining the virtually complete crosslinking or vulcanizing of the elastomer phase.

The crosslinking or vulcanizing system represents more particularly from 1 to 20 phr of constituent (B).

The plasticizer or plasticizers represent typically from 5 to 200 phr of constituent (B) and are selected especially from oils composed of mixtures of aliphatic, naphthenic or aromatic hydrocarbons, for the elastomers having unsaturated double bonds, and from polar oils based on esters of phthalic acid, for the acrylic elastomers.

The customary additives are generally selected from pulverulent inorganic fillers, such as zinc oxides and titanium oxides, carbon blacks, kaolins, and silicas, pigments, coupling agents, antidegradants, processing additives such as stearates, and waxes, and represent especially 10 to 150 phr of constituent (B).

Constituent (C)

Constituent (C) is composed of at least one graft copolymer having polyamide blocks, as is described in international PCT application WO 02/28959, and is obtainable by reacting an amino-terminal polyamide with the residues of an unsaturated monomer X attached by grafting or copolymerization to a polyolefin backbone. A graft copolymer of this kind is a flexible thermoplastic having high thermomechanical strength.

The monomer X may be, for example, an unsaturated epoxide or an unsaturated carboxylic acid anhydride.

Examples of unsaturated epoxides are, for example:

aliphatic glycidyl esters and ethers, such as allyl glycidyl ether, vinyl glycidyl ether, glycidyl maleate and glycidyl itaconate, glycidyl acrylate and glycidyl methacrylate; and alicyclic glycidyl esters and ethers, such as 2-cyclohexene 1-glycidyl ether, cyclohexene-4,5-diglycidyl carboxylate, cyclohexene-4-glycidyl carboxylate, 5-norbornene-2-methyl-2-glycidyl carboxylate, and endocis-bicyclo[2.2.1]-5-heptene-2,3-diglycidyl dicarboxylate.

Examples of unsaturated carboxylic acid anhydrides are especially maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic, and methylbicyclo[2.2.1]hept-5-ene-2,2-dicarboxylic anhydrides. It is advantageous to use maleic anhydride. Without departing from the scope of the invention, it is possible to replace some or all of the anhydride with an unsaturated carboxylic acid, such as, for example, (meth)acrylic acid.

As regards the polyolefin backbone, a polyolefin is defined as being a homopolymer or copolymer of alpha-olefins or diolefins, such as, for example, ethylene, propylene, but-1-ene, oct-1-ene, and butadiene. Examples include the following:

homopolymers and copolymers of ethylene, more particularly low-density polyethylene (LDPE), high-density polyethylene (HDPE), linear low-density polyethylene (LLDPE), very low-density polyethylene (VLDPE), and polyethylenes obtained by metallocene catalysis, described for example in the aforementioned international PCT application; copolymers of ethylene with at least one alpha-olefin, for example a $C_3$-$C_8$ alpha-olefin, such as ethylene/propylene copolymers, ethylene-propylene elastomers (EPR), and ethylene/propylene/diene elastomers (EPDM); copolymers of ethylene with at least one product selected from the salts or esters of unsaturated carboxylic acids, such as the esters of (meth)acrylic acid with $C_1$-$C_8$ alcohols, for example methyl acrylate, or the vinyl esters of saturated carboxylic acids, such as vinyl acetate, it being possible for the proportion of comonomer to be up to 40% by weight;

homopolymers and copolymers of propylene;

block styrene/ethylene-butene/styrene (SEBS), styrene/butadiene/styrene (SBS), styrene/isoprene/styrene (SIS), and styrene/ethylene-propylene/styrene (SEPS) copolymers.

The polyolefin of the backbone of the graft copolymer of constituent (C) may thus be selected from ethylene homopolymers, propylene homopolymers, copolymers of ethylene with $C_3$-$C_8$ alpha-olefins, with esters of (meth)acrylic acid and $C_1$-$C_8$ alcohols, and with vinyl acetate.

Advantageously, the polyolefin backbones to which the residues of X are attached are polyethylenes which are grafted with X, or are copolymers of ethylene and X that are obtained, for example, by free-radical polymerization.

As regards the polyethylenes to which X will be grafted, polyethylene is understood to mean homopolymers or copolymers.

Comonomers forming part of the constitution of these copolymers may include the following:

alpha-olefins, advantageously those having 3 to 30 carbon atoms, examples of such alpha-olefins being propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene, and 1-triacontene; these alpha-olefins may be used alone or as a mixture of two or more than two;

esters of unsaturated carboxylic acids, such as, for example, alkyl(meth)acrylates, it being possible for the alkyls to have up to 24 carbon atoms, examples of alkyl acrylate or methacrylate being especially methyl methacrylate, ethyl acrylate, n-butyl acrylate, isobutyl acrylate, and 2-ethylhexyl acrylate;

vinyl esters of saturated carboxylic acids, such as, for example, vinyl acetate or vinyl propionate;

dienes such as, for example, 1,4-hexadiene.

The polyethylene may comprise two or more of the aforementioned comonomers.

Advantageously, the polymer, which may be a mixture of two or more polymers, comprises at least 50% and preferably more than 75% (on a molar basis) of ethylene; its density may be between 0.86 and 0.98 g/cm$^3$. The MFI (index of viscosity at 190° C., 2.16 kg) is advantageously between 5 and 100 g/10 min.

Examples of polyethylenes include the following:
low-density polyethylene (LDPE);
high-density polyethylene (HDPE);
linear low density polyethylene (LLDPE);
very low density polyethylene (VLDPE);
polyethylene obtained by metallocene catalysis;
EPR (ethylene-propylene-rubber) elastomers;
EPDM (ethylene-propylene-diene) elastomers;
mixtures of polyethylene with an EPR or an EPDM; and
ethylene-alkyl(meth)acrylate copolymers possibly containing up to 60% and preferably 2% to 40% by weight of (meth)acrylate.

Grafting is an operation which is known per se.

As regards copolymers of ethylene and X, in other words copolymers in which X is ungrafted, these are copolymers of ethylene, X, and, optionally, a further monomer, which may be selected from the comonomers referred to above for the copolymers of ethylene that are intended for grafting.

It is advantageous to use ethylene-maleic anhydride and ethylene-alkyl(meth)acrylate-maleic anhydride copolymers. These copolymers comprise advantageously from 0.2% to 10% by weight of maleic anhydride, and from 0% to 40% and, preferably, 5% to 40% by weight of alkyl(meth)acrylate. Their MFI is between 5 and 100 (190° C.-2.16 kg). The alkyl (meth)acrylates have already been described above. The melting point is between 60 and 100° C.

Advantageously, there are on average at least 1.3 mol of X per chain that are attached to the polyolefin backbone, and, preferably, from 1.3 to 10, and more preferably from 1.3 to 7. A person skilled in the art is able easily to determine the number of these moles X by FTIR analysis.

As regards the amino-terminal polyamide, a polyamide is understood to comprise the condensation products of:

one or more amino acids, such as aminocaproic, 7-aminoheptanoic, 11-aminoundecanoic, and 12-aminododecanoic acids;

one or more lactams, such as caprolactam, enantholactam, and lauryllactam;

one or more salts or mixtures of diamines, such as hexamethylenediamine, dodecamethylenediamine, meta-xylylenediamine, bis-p-aminocyclohexylmethane, and trimethylhexamethylenediamine, with diacids, such as isophthalic, terephthalic, adipic, azelaic, suberic, sebacic, and dodecanedicarboxylic acids;

or mixtures of two or more monomers, thereby giving copolyamides.

It is possible to use mixtures of polyamides or copolyamides. It is advantageous to use PA 6, PA 11, PA 12, the copolyamide with 6 units and 11 units (PA 6/11), the copolyamide with 6 units and 12 units (PA 6/12), and the copolyamide based on caprolactam, hexamethylenediamine, and adipic acid (PA 6/6-6). The advantage of the copolyamides is that it is possible thereby to select the melting point of the grafts.

Advantageously, the grafts are homopolymers composed of residues of caprolactam, of 11-aminoundecanoic acid or of dodecalactam, or copolyamides composed of residues selected from at least two of the three aforementioned monomers.

The degree of polymerization may vary within large proportions; according to its value, the product is a polyamide or a polyamide oligomer. In the remainder of the text, either of the two expressions will be used for the grafts.

For the polyamide to have a monoamine termination, it is sufficient to use a chain stopper of formula:

in which:
R$_1$ is hydrogen or a linear or branched alkyl group containing up to 22 carbon atoms;
R$_2$ is a linear or branched alkyl or alkenyl group having up to 22 carbon atoms, a saturated or unsaturated cycloaliphatic radical, an aromatic radical, or a combination of the aforementioned.

The stopper may be, for example, laurylamine, stearylamine or oleylamine.

Advantageously, the grafts (amino-terminal polyamide) have a weight-average molar mass of less than 5000 g/mol, said mass being, for example, between 1000 and 5000 g/mol and preferably between 2000 and 4000 g/mol.

Very preferably, the grafts (amino-terminal polyamide) have a number-average molar mass of less than or equal to 5000 g/mol, said mass being, for example, from 1000 to 5000 g/mol and preferably from 2000 to 4000 g/mol.

The amino acid or lactam monomers which are preferred for the synthesis of the monoamine oligomer according to the invention are selected from caprolactam, 11-aminoundecanoic acid or dodecalactam. The monofunctional polymerization stoppers which are preferred are laurylamine, stearylamine, and oleylamine. The polycondensation defined above takes place in accordance with the processes which are commonly known, at a temperature, for example, of in general between 200 and 300° C., under vacuum or under an inert atmosphere, with stirring of the reaction mixture. The average chain length of the oligomer is determined by the initial molar ratio between the polycondensable monomer or the lactam and the monofunctional polymerization stopper. For the calculation of the average chain length, it is customary to count one molecule of chain stopper to one chain of oligomer.

The addition of the monoamine polyamide oligomer to the polyolefin backbone comprising X takes place by reaction of an amine function of the oligomer with X. Advantageously, X carries an anhydride or acid function, and in this way amide or imide bonds are produced.

The addition of the amine-terminal oligomer to the polyolefin backbone comprising X is performed preferably in the melt state. In this way, in an extruder, it is possible to mill the oligomer and the backbone at a temperature in general of between 230 and 250° C. The average residence time of the melted material in the extruder may be between 1 and 3 minutes. The yield of this addition is evaluated by selective extraction of the free polyamide oligomers, in other words those which have not reacted to form the final graft copolymer having polyamide blocks.

The preparation of such amino-terminal polyamides and their addition to a polyolefin backbone comprising X are described in U.S. Pat. Nos. 3,976,720, 3,963,799, 5,342,886, and FR 2,291,225.

The graft copolymers having polyamide blocks of the present invention are characterized by a nanostructured organization. In these copolymers, a nanostructured organization is defined by polyamide lamellae having a thickness of between 10 and 15 nanometers, or else by an elastic modulus, measured by thermomechanical analysis at a frequency of 1 Hz on a Rheometrics dynamic rheometer, of more than 0.5 MPa, at the center of the range between the melting point of the polyolefin backbone and the melting point of the polyamide graft, when the melting point of the polyolefin backbone is less by at least 40° C. than that of the polyamide graft.

The thickness of the polyamide lamellae may be advantageously measured by a person skilled in the art with the known technique of Transmission Electron Microscopy and standard image processing software.

In accordance with one particular embodiment, the graft copolymer having polyamide blocks may take the form of its precursors formed from the mixture of polyolefin backbone+amino-terminal polyamide grafts.

In this case, the graft copolymer (C) is produced in situ by mixing the polyolefin backbone and the amino-terminal grafts, the final mixture necessarily giving a TPV.

The present invention further provides a crosslinked or vulcanized thermoplastic composition characterized in that it is formed from the mixture of (A), (B) and (C) as defined above, wherein the elastomer of constituent (B) has been crosslinked or vulcanized during mixing with constituents (A) and (C).

The present invention also provides a process for preparing the composition as defined above, characterized in that the formulation of constituent (B) with constituents (A) and (C) is milled at a sufficient temperature and for a sufficient period of time to crosslink or vulcanize the elastomer of constituent (B). A process of this kind is referred to as a "dynamic vulcanizing or crosslinking process". The milling may be carried out in conventional apparatus such as, for example, a Banbury mill, a Brabender mill, a Rheocord mill or an extruder, at a temperature of between 150° C. and 240° C. approximately, for a time of between 3 and 15 minutes approximately, this time decreasing in inverse proportion to the temperature.

The present invention provides, lastly, a finished article, at least one of whose constituents is obtained from the composition as defined above, or obtained by the process as defined above, or from the mixture of the crosslinked or vulcanized thermoplastic composition of (A)+(B) with the constituent (C), by the usual techniques for processing plastics such as, without implied limitation, extrusion or coextrusion, extrusion coating, injection molding, compression molding, calendaring, deposition on cable, deposition of powders after grinding, including by the processes of electrostatic spraying, fluidized bed dipping, laser prototyping, rotor molding or slush molding, said latter process being known to the person skilled in the art an denotin a process of molding by free flow of powder in a hot mold, especially for producing "skins" for dashboards, door panels or consoles.

An article of this kind may therefore be a single-material or multi-material article, and may be composed, for example, of an adhesive or an adhesion binder, a coating, a film, a plate or a flexible tube, in single-layer or multilayer form, a seal for the construction and automotive industries, a protective bellows for the automotive industry, and an injection-molded article, in single-material or multi-material form.

The present invention provides, lastly, for the use of a graft copolymer having polyamide blocks, said copolymer being composed of a polyolefin backbone and of on average at least 1.3 polyamide grafts on said backbone, and having a nanostructured organization, in which said grafts are attached to the backbone by the residues of an unsaturated monomer (X) having a function which is capable of reacting with an amino-terminal polyamide; and the residues of said unsaturated monomer (X) being attached to the backbone by grafting or copolymerization from its double bond, as an agent improving the surface properties or thermomechanical properties of a crosslinked or vulcanized thermoplastic composition, said agent being introduced directly into the mixture subjected to dynamic vulcanizing or crosslinking, or in a mixture with said vulcanized or crosslinked thermoplastic composition when it is employed.

The composition according to the invention may in particular, but not exclusively, be combined, in the aforementioned articles, according to the invention, with other polymeric materials such as polyamides and polyolefins, or else with metals or glass.

The articles may be used in various applications, examples of which are given hereinbelow, though without limiting the scope of the invention: fuel or cooling fluid transport lines, electrical cables, cable transport sheaths, adhesives, layers or coatings for thermal protection, seals for the construction and automotive industries, and protective bellows for the automotive industry.

The examples which follow illustrate the present invention, but without limiting its scope. In these examples, the parts and percentages are by weight, unless indicated otherwise.

EXAMPLE 1 (COMPARATIVE)

The reference is a thermoplastic elastomer composed of 35% of a polypropylene with an MFI of 2 g/10 min (at 230° C. under 2.16 kg), A, and of 65% of a formulated EPDM B, crosslinked with a system based on phenolic resin and comprising 150 phr of aliphatic oil.
Composition of B

| | |
|---|---|
| EPDM | 100 phr |
| Polyphenol crosslinking agent with degree of polymerization of between 4 and 5 | 12 phr |
| Zinc oxide accelerator | 12 phr |
| Aliphatic plasticizer | 150 phr |
| Kaolin | 40 phr |
| Titanium oxide pigment | 10 phr |

This thermoplastic elastomer has a Shore A hardness of 65 and a compression set, measured at 80° C., of 35%.

Its creep resistance at 180° C. on an injection molded bar subjected to a stress of $4.9 \times 10^4$ Pa (0.5 kg/cm$^2$) is negligible, because the test specimens rapidly break.

Its elastic modulus at 180° C., measured with a Rheometrics dynamic rheometer at a frequency of 1 Hz, is less than 0.1 MPa.

EXAMPLE 2 (COMPARATIVE)

On a Brabender mixer rotating at 80 rpm, for 8 minutes, and regulated at 180° C., we produced an alloy composed of 75% of the mixture of example 1 (35% by weight of a polypropylene with an MFI of 2 g/10 min (at 230° under 2.16 kg), A, +65% by weight of a formulated EPDM elastomer, B, comprising a crosslinking system based on phenolic resin and 150 phr of aliphatic oil), with the addition of 25% by weight of a graft copolymer having polyamide blocks, C, not synthesized by the process described in WO 02/28959: this graft copolymer having polyamide blocks is composed of 80% of a maleinized polypropylene, containing 1% by weight of grafted maleic anhydride, and of 20% of polyamide 6, with a weight-average molecular mass of 40 000 g/mol.

The addition of the graft copolymer having polyamide blocks, relative to example 1, may be carried out, for example, with the aim of improving the properties of adhesiveness to polyamides.

The thermoplastic elastomer obtained has a Shore A hardness of 75 and a compression set at 80° C. of 40%.

Its creep resistance at 180° C. on an injection molded bar subjected to a stress of $4.9 \times 10^4$ Pa (0.5 kg/cm$^2$) is negligible, because the test specimens rapidly break.

Its elastic modulus at 180° C., measured with a Rheometrics dynamic rheometer at a frequency of 1 Hz, is less than 0.1 MPa.

EXAMPLE 3, ACCORDING TO THE INVENTION

On a Brabender mixer rotating at 80 rpm, for 8 minutes, and regulated at 180° C., we produced an alloy composed of 75% of the mixture of example 1 (35% by weight of a polypropylene with an MFI of 2 g/10 min (at 230° under 2.16 kg), A, +65% by weight of a formulated EPDM elastomer, B, comprising a crosslinking system based on phenolic resin and 150 phr of aliphatic oil), with the addition of 25% by weight of a graft copolymer having polyamide blocks, C, synthesized by the process described in WO 02/28959, and composed of 80% of an ethylene/ethyl acrylate/maleic anhydride terpolymer in amounts by weight of 80/17/3, and of 20% of polyamide 6 grafts, with a weight-average molecular mass of 3000 g/mol.

The thermoplastic elastomer obtained has a Shore A hardness of 70 and a compression set at 80° C. of 40%.

Its creep at 180° C. on an injection molded bar subjected to a stress of $4.9 \times 10^4$ Pa (0.5 kg/cm$^2$) is 50% after 15 minutes.

The elastic modulus of this composition, measured with a Rheometrics dynamic rheometer at a frequency of 1 Hz, is greater than 0.5 MPa.

Thus it is found that the product according to example 3, with addition of a PA-grafted copolymer synthesized by the process described in WO 02/28959, thus exhibits much better thermomechanical performance, characterized by the creep test at 180° C. or the elastic modulus measurement at 180° C., than the products according to examples 1 and 2.

It is also found that the change in hardness relative to the reference composition (according to example 1) is smaller for the composition according to the invention of example 3 than for the composition of example 2.

The invention claimed is:

1. A mixture consisting of, per 100 parts by weight of (A)+(B):
   (A) 10 to 90 parts by weight of at least one non-nanostructured olefinic thermoplastic polymer;
   (B) 90 to 10 parts by weight of a formulation of at least one elastomer which has unsaturated double bonds and is capable of reacting with a crosslinking or vulcanizing agent, said formulation including a system for crosslinking or vulcanizing said elastomer or elastomers, at least one plasticizer, and other additives;
   (C) 10 to 100 parts by weight, relative to (A)+(B), of at least one graft copolymer having polyamide blocks, said copolymer being composed of a polyolefin backbone and of on average at least 1.3 polyamide grafts on said backbone, and having a nanostructured organization, in which said grafts are attached to the backbone by the residues of an unsaturated monomer (X) having a function which is capable of reacting with an amino-terminal polyamide; and the residues of said unsaturated monomer (X) being attached to the backbone by grafting or copolymerization from its double bond, it being possible for (A) and (B) in the mixture to have already being combined together by the dynamic vulcanizing or crosslinking process, to give a vulcanized or crosslinked thermoplastic composition, wherein said polyamide grafts have a number-average molar mass of less than 5000 g/mol, wherein the copolymer having polyamide blocks has a nanostructured organization with polyamide lamellae having a thickness of between 10 and 50 nanometers, or with an elastic modulus, measured by thermomechanical analysis at a frequency of 1 Hz on a Rheometrics dynamic rheometer, of more than 0.5 MPa, at the center of the range between the melting point of the polyolefin backbone and the melting point of the polyamide graft, when the melting point of the polyolefin backbone is less by at least 40° C. than that of the polyamide graft, wherein the additives are selected from the group consisting of pulverulent inorganic fillers, zinc oxides and titanium oxides, carbon blacks, kaolins, silicas, pigments, coupling agents, antidegradants, processing additives, stearates, and waxes, and represent 10 to 150 phr of constituent (B).

2. The mixture as claimed in claim 1, wherein the proportion of constituent (C) is from 10 to 90 parts by weight relative to (A)+(B).

3. The mixture as claimed in claim 1, wherein the thermoplastic olefinic polyolefin or polyolefins are selected from ethylene homopolymers, propylene homopolymers, copolymers of ethylene with $C_3$-$C_8$ alpha-olefins, copolymers of ethylene with esters of (meth)acrylic acid and copolymers of ethylene $C_1$-$C_8$ alcohols, and with vinyl acetate.

4. The mixture as claimed in claim 1, wherein the unsaturated elastomer of constituent (B) is selected from:
terpolymers of ethylene, propylene, and a diene (EPDM);
elastomers based on butadiene, natural (NR) or synthetic, and styrene-butadiene copolymers (SBR);
copolymers of butadiene with acrylonitrile (NBR);
partially hydrogenated copolymers of butadiene with acrylonitrile (HNBR);
elastomers based on isoprene (IR); and
acrylic elastomers.

5. The mixture as claimed in claim 4, wherein the crosslinking or vulcanizing system is selected from the group consisting of vulcanizing agents based on sulfur, peroxide, phenolic resin and on azo maleimido, quinoid, and urethane compounds, for the diene elastomers; from agents based on polyfunctional amines, hexamethylenediamine carbamate, and on diisocyanates, for acrylic elastomers having acid groups; and from agents based on ammonium salts, 2-methylimidazole and the molecules of polyfunctional acids, for acrylic elastomers having an epoxide group.

6. The mixture as claimed in claim 1, wherein the crosslinking or vulcanizing system represents 1 to 20 phr of constituent (B).

7. The mixture as claimed in claim 1, wherein the plasticizer or plasticizers represent 5 to 200 phr of constituent (B), and are selected from oils composed of mixtures of aliphatic, naphthenic or aromatic hydrocarbons, for the elastomers having unsaturated double bonds, and from polar oils based on esters of phthalic acid, for the acrylic elastomers.

8. The mixture as claimed in claim 1, wherein X is an unsaturated carboxylic acid anhydride.

9. The mixture as claimed in claim 8, characterized in that the polyolefin backbone comprising X is selected from ethylene-maleic anhydride and ethylene-alkyl (meth)acrylate-maleic anhydride copolymers.

10. The mixture as claimed in claim 8, wherein there are on average 1.3 to 10 mol of X, attached to the polyolefin backbone of constituent (A).

* * * * *